United States Patent [19]

Daniele

[11] 4,158,755
[45] Jun. 19, 1979

[54] TELEPHONE SYSTEM OPEN SWITCHING INTERVAL PROTECTION CIRCUIT

[75] Inventor: Phillip P. Daniele, Oceanport, N.J.

[73] Assignee: Bell Telephone Laboratories, Incorporated, Murray Hill, N.J.

[21] Appl. No.: 924,695

[22] Filed: Jul. 14, 1978

[51] Int. Cl.² .............................................. H04Q 5/18
[52] U.S. Cl. ................................................ 179/99 H
[58] Field of Search .................... 179/99, 81 R, 18 FA

[56] References Cited

U.S. PATENT DOCUMENTS

| | | | |
|---|---|---|---|
| 3,764,752 | 10/1973 | Yachabach | 179/99 |
| 3,840,710 | 10/1974 | Limiero et al. | 179/99 |
| 3,857,072 | 12/1974 | James et al. | 179/99 |
| 3,895,192 | 7/1975 | Angner et al. | 179/99 |
| 3,996,426 | 12/1976 | Lancaster | 179/99 |
| 4,064,373 | 12/1977 | Pinede et al. | 179/99 |
| 4,093,830 | 6/1978 | Pappas | 179/99 |

Primary Examiner—Kathleen H. Claffy
Assistant Examiner—Gerald L. Brigance
Attorney, Agent, or Firm—Howard R. Popper

[57] ABSTRACT

A circuit which can be appliqued to external terminals of a prior art key telephone line circuit to protect the circuit from prematurely cancelling a customer-applied holding condition when the central office exhibits an open switching interval (OSI) condition is described. The appliqued circuit monitors a contact of the key system hold relay, and when that relay is released by the appearance of an OSI condition, temporarily reconnects the winding of the hold relay across the line so that the hold relay can respond to the reappearance of central office line current if it appears after a normal OSI interval and which disconnects the hold relay if line current does not appear as during a permanent signal condition.

5 Claims, 2 Drawing Figures

TELEPHONE SYSTEM OPEN SWITCHING INTERVAL PROTECTION CIRCUIT

BACKGROUND OF THE INVENTION

This invention relates to an open switching interval protection circuit, and, more particularly, to a circuit for guarding against premature release of key system holding conditions due to central office network reconfigurations.

There are, today, approximately a million telephone stations installed on customer premises which operate with an older type of key telephone system. This type of key telephone system was originally installed at a time when telephone central offices were all of the electro-mechanical type. With the advent of electronic central office switching systems, such as the No. 1 ESS manufactured by Western Electric Company, a new type of telephone office switching operation came into use. In the ESS type of switching system employing ferreed crosspoints, battery may temporarily be removed from the tip and ring conductors during switching network reconfigurations. The period of time during which battery may so be removed from the line is called the open switching intervaL (OSI) and may last up to 460 milliseconds. At the customer's premises, the key telephone system of the older type, known as the 1A1 key telephone system, may be sufficiently sensitive to the OSI to inadvertently disconnect or drop a holding condition that had been placed on the line by the customer.

Heretofore, a number of solutions have been proposed to prevent the 1A1 key telephone system from inadvertently dropping held calls when served by an electronic central office. For example, the newer type line circuits, such as the 400 type circuit manufactured by Western Electric Company, include circuitry for maintaining the holding bridge connection during the OSI. This line circuit disclosed in Limiero U.S. Pat. No. 3,840,710, issued Oct. 8, 1974, contains a delay circuit that prevents the release of the holding bridge for a certain period of time when the line current is interrupted. The time interval is predeterminable by strap connections accessible on the line circuit terminal strip.

Another approach is shown in Angner et al U.S. Pat. No. 3,895,192, issued July 15, 1975, which contains a circuit for timing the release of the holding bridge when the line current is interrupted. This arrangement uses a time delay interval controlled by a capacitor discharge circuit.

Still another approach is shown in Lancaster U.S. Pat. No. 3,996,426, issued Dec. 7, 1976. This arrangement involves the switching-in of an auxiliary 48-volt battery supply directly across the tip and ring leads to replace the central office battery that is removed during the OSI. Since the operation of the detector circuitry of the Lancaster arrangement depends on its direct connection across the tip and ring of the line, special circuitry is required to inhibit its operation during ringing and during power cross testing which is performed by the electronic central office switching system on every call origination. Because the Lancaster arrangement requires 48-volt battery which is not usually available in the key telephone systems located at customer's premises, the Lancaster arrangement is suitable for use only at the central office. In addition, because of leakage current that may be present between the tip and ring leads and ground, the bias of the detectors used in the Lancaster patent circuit may be affected and lead to unreliable operation.

Other prior art approaches to the solution of the problem that involve alteration to the ferreed contacts to withstand continuous line current during switching or the reprogramming of the switching operation are discussed in the Lancaster patent.

SUMMARY OF THE INVENTION

In accordance with my invention, rather than depending upon monitoring the line current for the appearance of the OSI as in the foregoing Limiero, Angner and Lancaster prior art patents, and also instead of switching auxiliary voltage across the line as in the Lancaster patent, my circuitry monitors a contact of the key system holding relay and is therefore completely prevented from responding to line surges, ringing voltages, line crosses, etc. More particularly, my circuit is normally held inoperative by the same ground which maintains the A relay in the key system operated during the picked-up, or talking, state of the line. When a hold condition is applied by the customer, and the aforementioned A relay ground is removed, my circuit is no longer inhibited and is enabled to monitor a contact of the hold relay. When the hold relay releases on the appearance of the OSI condition, a timing circuit operates to reconnect the winding of the hold relay in circuit with the central office line so that the winding of the hold relay may respond to the reappearance of central office battery and ground at the end of the OSI state. Should the open signal condition persist for longer than the maximum permitted OSI state interval, the timing circuitry of my invention removes the winding of the hold relay from the central office line allowing the holding condition to be terminated. Further in accordance with an aspect of the operation of my invention, the winding of the hold relay is prevented from inadvertently being short circuited during the continuance of the OSI condition so that the winding of the hold relay may be rendered effective to respond to the reappearance of central office line current should it occur during a predetermined interval.

BRIEF DESCRIPTION OF THE DRAWING

The foregoing and other objects and features of my invention will become apparent from the ensuing technical description and drawing in which.

TECHNICAL DESCRIPTION

Figure 1:
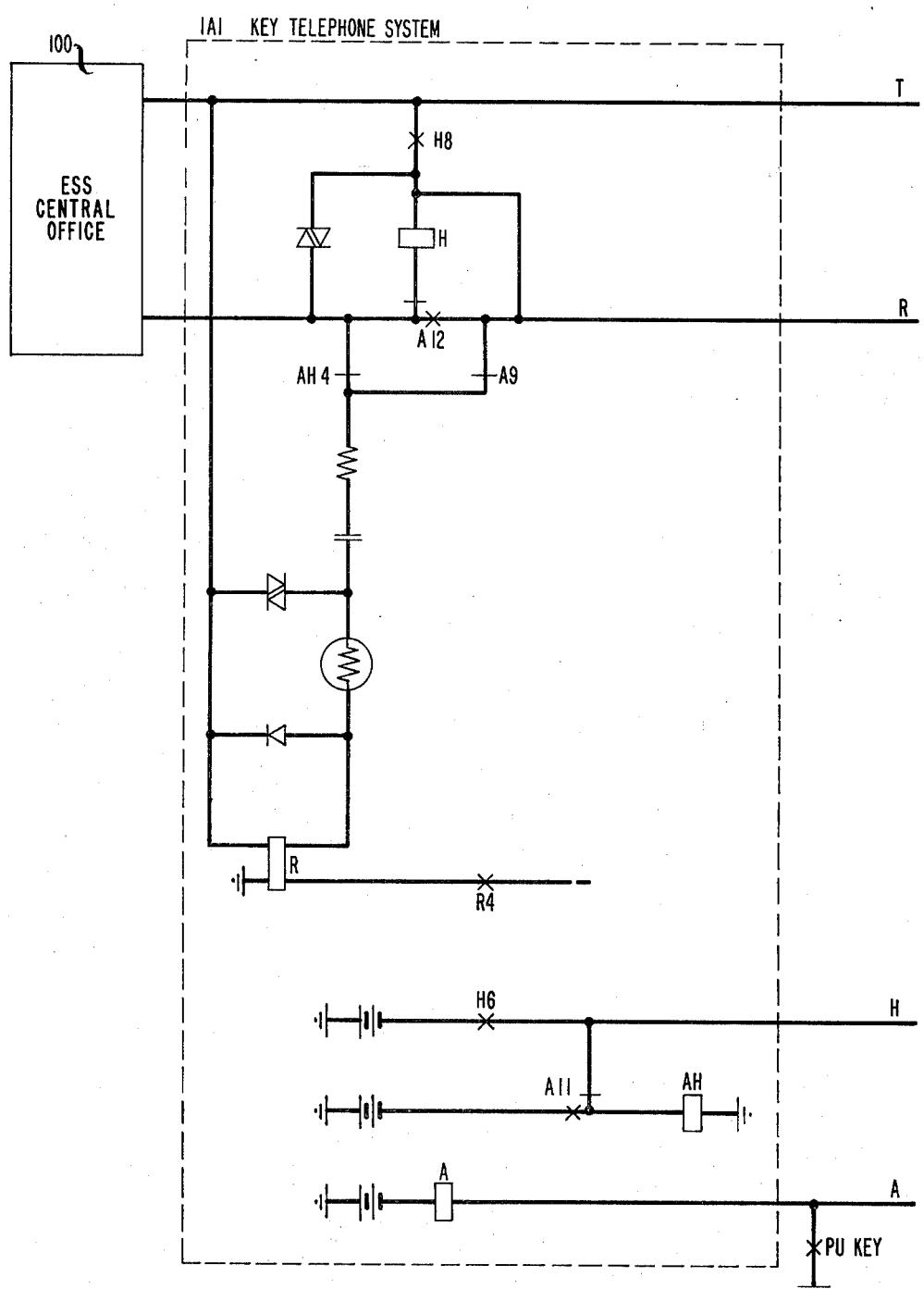
FIG. 1 shows a central office and portions of a prior art key telephone.

In FIG. 1, a conventional electronic central office 100 is shown with the tip and ring conductors T,R of an illustrative telephone line connecting the central office with a prior art key telephone system 102 located remotely from the central office and, typically, on the premises of a telephone customer. Only those circuitry details of the prior art key telephone system necessary to an understanding of the operation of the present invention is included in FIG. 1.

Telephone central office 100 may include a plurality of ferreed crosspoints (not shown) having contacts in series with the tip conductor T and ring conductor R. Whenever these ferreed crosspoints are to be operated, the control equipment (not shown) in the central office makes sure that the tip and ring conductors connected to the ferreed contacts are not in a current-carrying state. This is necessary to prevent the contacts from burning and thereafter sticking or welding together. During the time that these contacts are forced to be in the non-current carrying state incident to the reconfiguration of the network at the central office, the connection is said to be in the open switching interval (OSI) state. This state typically may last up to 460 milliseconds.

Associated with the tip and ring conductors T,R of the customer's line at key telephone system 102, is the conventional telephone station handset (not shown) for effecting voice communcations over the tip and ring conductors, a pick-up key and a hold button (also not shown). Of the aforementioned telephone station apparatus, only one contact PUKEY of the pick-up key is shown in FIG. 1 since that is the only circuitry of the customer's telephone set which need be depicted in order to understand the operation of my invention.

With the line in the picked-up condition before the onset of a customer-applied holding condition, relay A of key telephone system 102 will normally be held operated by ground applied to the winding of that relay over contact PUKEY of the telephone station. With relay A operated, the make contact of transfer contacts 12 of relay A is operated extending a through-metallic path for the ring conductor from the handset of the customer's telephone station (not shown) to central office 100.

When the customer desires to place the line in the holding state, the hold button at the telephone station (not shown) is operated. A break contact (not shown) in series with contact PUKEY interrupts the ground provided by the contact PUKEY causing relay A in the telephone system 102 to release. The release of Relay A causes the make contact of its transfer contacts 12 to interrupt the continuity of the ring lead R between the telephone station's handset (not shown) and central office 100. The released break contact of transfer contacts 12 of relay A connects the lower half of the winding of the hold relay H to ring lead R. A holding bridge across conductors T and R toward central office 100 is thereby provided which may be traced from conductor T, the telephone station handset (not shown), the winding of hold relay H and break contact 12 of the transfer contacts of relay A to ring conductor R. Relay H operates to central office battery and ground and locks to the tip conductor over contact H8.

With relay H operated and relay A released, a path is completed from battery, make contact H6 and the break contact of transfer contacts 11 of relay A to the winding of auxiliary hold relay AH which operates. Relay AH in operating, at its operated break contact AH4, opens the shorting path across the winding of relay H that might otherwise be completed in series with released break contact 9 of relay A and which path would also otherwise bridge the released make contact of transfer contacts 12 of relay A. Accordingly, relay AH must be operated during the holding condition, inter alia, to maintain the interruption of the continuity of ring lead R.

Figure 2:
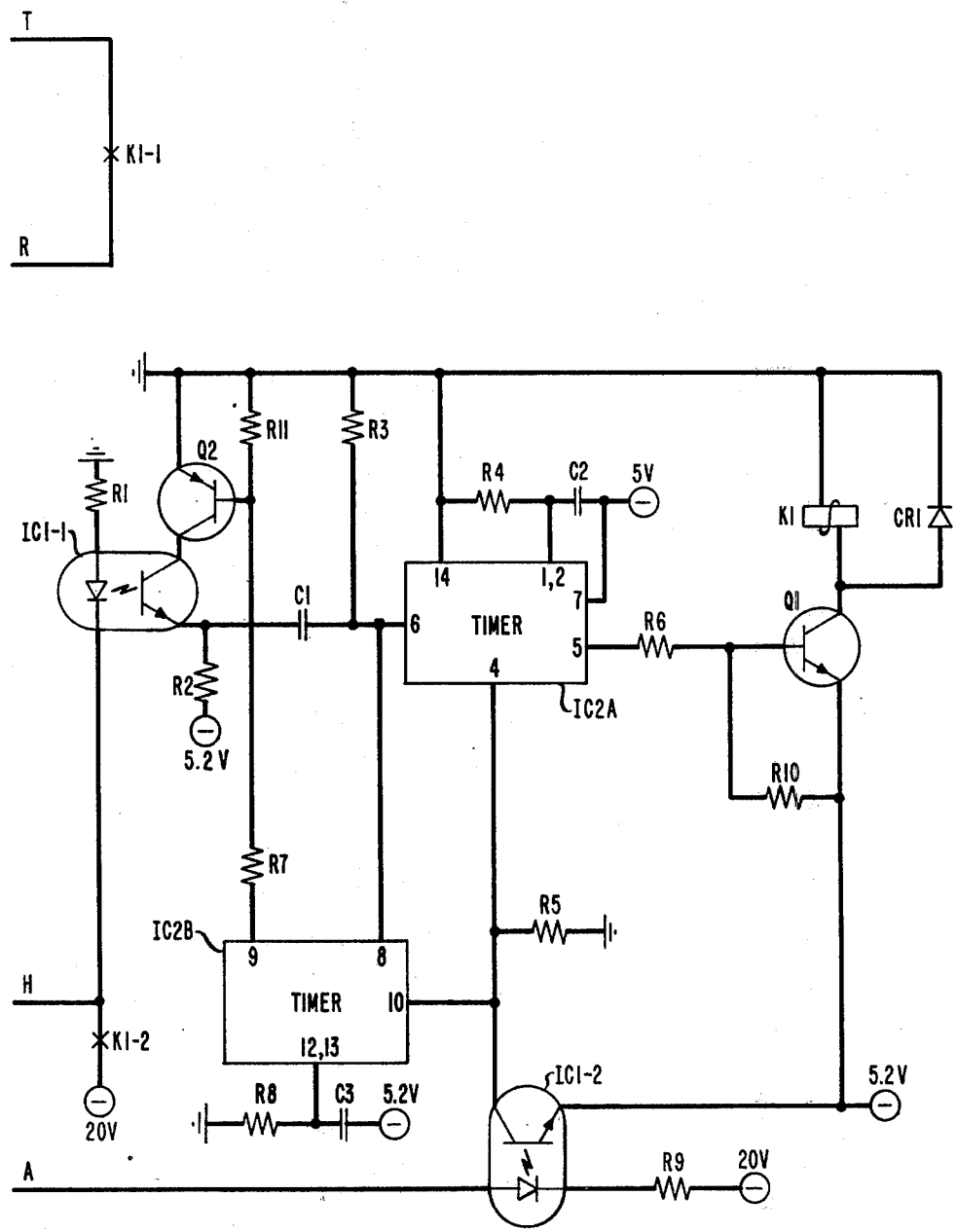
FIG. 2 shows the circuitry of my invention for preventing the inadvertent termination of a customer applied hold condition when the central office of FIG. 1 exhibits the OSI state.

All of the foregoing operations are well-known and understood in connection with the operation of prior art key telephone system 102 which illustratively may be of the aforementioned type 1A1. Referring briefly to FIG. 2, it is to be noted that there is no detector circuitry of my invention connected to the tip and ring conductors. Only an auxiliary holding contact K1-1 of relay K1, the operation of which will shortly be described, is connected to conductors T,R and, accordingly, the circuitry of my invention is "transparent" to the tip and ring conductors and cannot provide any leakage paths to ground or longitudinal imbalance.

Referring now to FIG. 2 for purposes of describing its operation, it is to be noted that during the pick-up condition of the line, so long as pickup key PUKEY (FIG. 1) is maintaining ground to keep key telephone system relay A operated, ground is also applied to lead A to forward bias the diode of optoisolator IC1-2 in FIG. 2. Current through the aforementioned diode turns ON the transistor of the optoisolator which, in turn, applies inhibiting voltage to timers IC2A and IC2B.

When, during the continuance of the holding conditions, make contact 6 of relay H of FIG. 1 applies operating battery to the winding of relay AH, the same contact also applies battery over lead H in FIG. 2 to forward bias the diode section of opto-isolator IC1-1. The transistor portion of opto-isolator IC1-1 is thereby made conductive providing a path through its collector-emitter junction and the collector-emitter junction of transistor Q2 to prevent capacitor C1 from being charged. Capacitor C1 therefore will remain uncharged so long as the line circuit is in the holding condition.

With the line in the holding state, the telephone customer may pick up the line and return the line to an active state by causing relay A to be reoperated. The reoperation of relay A at the customer's termination of the holding condition disconnects the winding of hold relay H from the ring conductor and reestablishes the continuity of the ring conductor to the handset (not shown).

If, however, the customer does not willingly remove the holding condition, but central office 100 suddenly exhibits the OSI state, battery and ground (not shown) will be removed at the central office from leads T,R and the line current to the winding of relay H will be interrupted, causing relay H to release. If nothing further is done, the release of relay H at its released make contact H8 will open the holding bridge theretofore provided across the tip and ring conductors and, at the end of the OSI condition, the central office will see an open circuit. Responsive to the appearance of the open circuit, the central office switching system will take down the switching path (not shown) that it had extended to the customer's line. This is an undesirable situation.

In accordance with the operation of the circuitry of my invention, the release of relay H by the OSI condition is sensed by the diode of opto-isolator IC-1. By the release of make contact H8 this diode is deprived of the operating current it normally passes during the holding condition. The transistor portion of opto-isolator IC1-1 is thereby rendered non-conductive, no longer drops voltage across resistor R2 and capacitor C1 applies a negative voltage pulse to timers IC2A and IC2B, which commence timing. Capacitor C1 then continues to charge in series with resistors R2 and R3. Timer IC2A turns on transistor Q1, operating relay K1. At the same time, timer IC2B turns off transistor Q2 further opening the path that had been available when the transistor portion of opto-isolator IC1-1 was in the conducting state. The especial function of transistor Q2 will hereinafter be more fully explained.

The operation of relay K1 at its make contacts K1-1 applies a holding bridge across the tip and ring conductors T,R toward the central office. This holding bridge may be traced from the tip conductor T through operated make contact K1-1, the winding of relay H and the released break contact of transfer contacts 12 of relay A to the ring conductor R. Operated make contact K1-2 applies negative battery to lead H maintaining relay AH in key system 102 operated despite the release of make contact 6 of relay H.

Timer IC2A is advantageously designed to time for an interval of 517 milliseconds. Should central office 100 remove the OSI condition within this interval, relay H will again operate since the upper end of the winding of relay H has been connected to the tip conductor T by make contact K1-1 and the lower end of the winding relay H is connected to the ring conductor by the break contact of transfer contacts 12 of relay A.

If the central office does not resume line current within the timing interval to which timer IC2A has been preadjusted (illustratively, 517 milliseconds), relay K1 will be released by timer IC2A, thereby releasing contacts K1-1 and removing the holding bridge provided across the tip and ring conductors. The circuitry of FIG. 2 accordingly exhibits the ability to distinguish between the OSI condition and a permanent signal condition without interfering with normal line pick-up or line idle conditions.

It will be observed that, when the line is in the picked-up state, both relays A and AH are operated, and that, during the holding state, relay A is released, but relays H and AH are operated. When the OSI conditions appears and relay H releases, the operating battery for relay AH is removed by the release of make contact 6 of relay H, but is restored by the operation of contact K1-2 of my circuit. Maintaining relay AH operated after the release of relay H (and its make contact H6) is important as otherwise a short circuit would exist across the winding of relay H by released contacts AH4 and A9. Such a short circuit would prevent the winding of the H relay from responding to the reappearance of battery and ground by the central office. So that the winding of the H relay may, in fact, be rendered responsive to the reappearance of battery and ground, by the central office, relay AH is provided with an auxiliary operating path by contacts K1-2 of my circuit. Timer IC2B is advantageously designed to have a time interval approximately 10% greater than the timing interval of timer IC2A.

At the end of the timing interval of timing circuit IC2A, relay K1 is released, thereby releasing contacts K1-2 and removing the forward bias on the diode of opto-isolator IC1-1. If the collector of the transistor portion of opto-isolator IC1-1 were connected directly to ground, the transistor portion would be turned off, thereby permitting another (and erroneous) triggering pulse to be applied to timer IC2A. To prevent this false retriggering of timer IC2A, timer IC2B maintains transistor Q2 turned off for a short time interval longer than the interval timed by timer IC2A.

It is to be noted that the circuitry of my invention illustrated in FIG. 2 may advantageously be appliqued to the externally accessible terminals of the key telephone system line circuit of FIG. 1. In this manner, no dislocation of key system circuit operation is occasioned by the installation of the circuitry of my invention.

What has been described is illustrative of the principles of operation of my invention. In one illustrative embodiment, the following components values were employed:

| Capacitors | | |
|---|---|---|
| C1 | KS19774-L5 | .47μfd |
| C2 | 535JA | .517 μfd |
| C3 | 535JA | .517 μfd |
| Diodes | | |
| CR1 | 456F | |
| Relays | | |
| K1 | 348A | |
| Resistors | | |
| R1 | KS20289L6C | 909R |
| R2 | KS20810L1A | 1K |
| R3 | KS20810L1A | 51K1 |
| R4 | KS20810L1A | 1M21 |
| R5 | KS20810L1A | 51K1 |
| R6 | KS20810L1A | 4640 |
| R7 | KS20810L1A | 5K10 |
| R8 | KS20810L1A | 1M47 |
| R9 | KS20810L1A | 5K10 |
| R10 | KS20810L1A | 51K1 |
| R11 | KS20810L1A | 51K1 |
| Integrated Circuits | | |
| IC1 | | 2C |
| IC2 | | NE556 Signetics |
| Transistors | | |
| Q1 | | 66G |
| Q2 | | 51A |

I claim:

1. An arrangement for preventing a key telephone system connected to a central office line from improperly releasing a customer-applied holding condition when the central office exhibits an open switching interval that interrupts line current to release an operated hold apparatus in the key system, comprising:
    means for detecting the release of said hold apparatus, and
    switching means controlled by said detecting means for temporarily reconnecting said hold apparatus in circuit with said central office line after said central office interrupts said line current.

2. An arrangement according to claim 1 wherein the operated hold apparatus in the key system is a hold relay having a winding for sensing said line current, and wherein said means for detecting the release of said hold relay is connected to a contact of said hold relay.

3. An arrangement according to claim 2 wherein said switching means includes a contact path for temporarily reconnecting said winding of said hold relay across said line.

4. An arrangement according to claim 3 wherein said switching means includes a timing circuit triggered by said detecting means, said timing circuit thereupon timing for an interval longer than that of a permissible OSI state and shorter than an interval indicating a permanent signal state.

5. An arrangement according to claim 2 wherein said key system includes a contact path for completing the continuity of one conductor of said line prior to the operation of said hold relay and means under control of said hold relay for interrupting the continuity of said one conductor during the continuance of a holding condition, CHARACTERIZED IN THAT said switching means includes an arrangement for temporarily maintaining said interruption of conductor continuity when said hold relay is released.

* * * * *